Nov. 1, 1960     J. A. PEYTON     2,958,350
DEBARKING APPARATUS
Filed Aug. 7, 1958     2 Sheets-Sheet 2
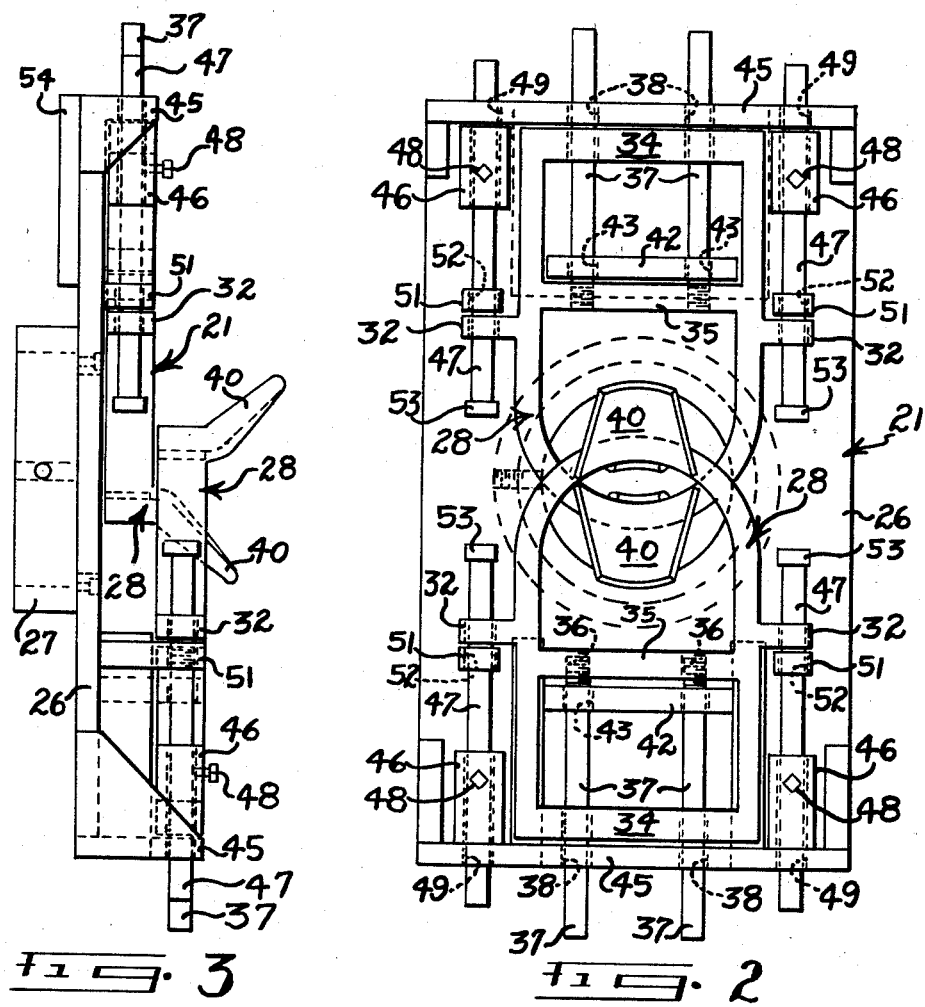
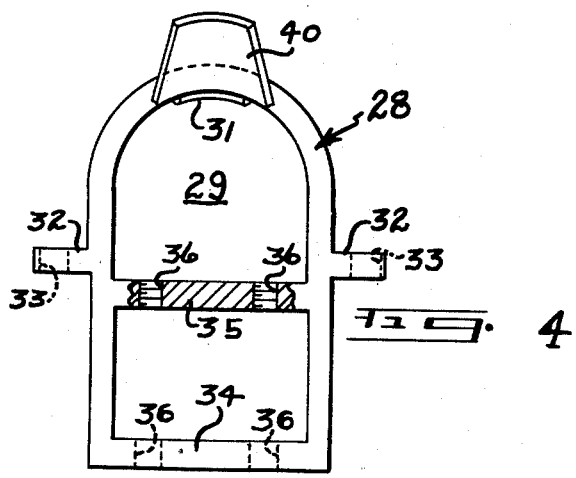
INVENTOR.
Jesse Arnold Peyton
BY
Jennings, Carter & Thompson
Attorneys

United States Patent Office 2,958,350
Patented Nov. 1, 1960

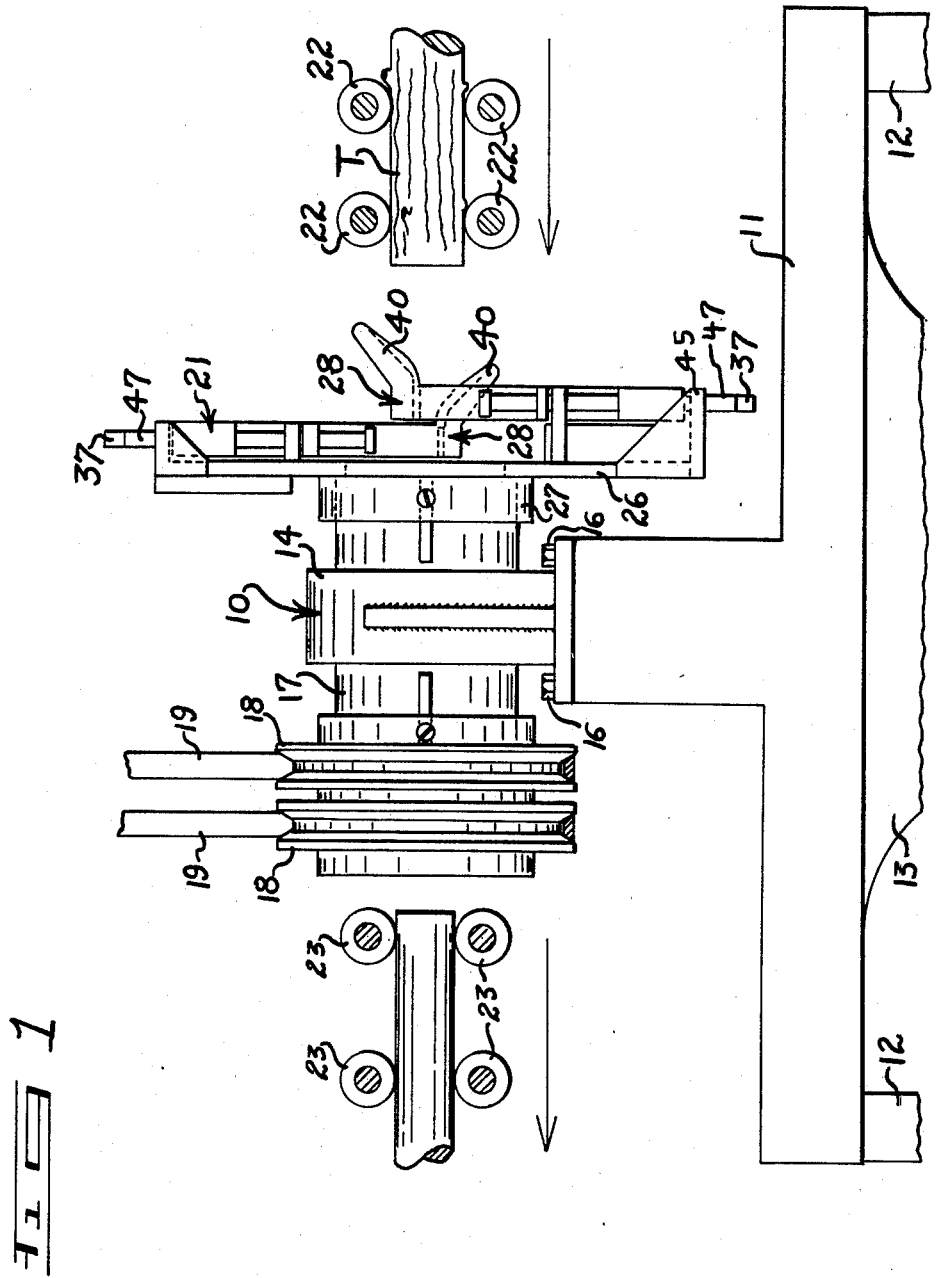

2,958,350

DEBARKING APPARATUS

Jesse Arnold Peyton, Birmingham, Ala., assignor to Jackson Industries, Inc., a corporation of Alabama Filed Aug. 7, 1958, Ser. No. 753,777

2 Claims. (Cl. 144—208)

This invention relates to apparatus for debarking generally round members, such as trees and the like, and more particularly to such apparatus in which a rotary debarking head is provided for removing bark from trees and the like.

More specifically, my invention comprises a debarking head having an axially extending opening through which the member to be debarked, such as a tree, is passed, and the debarking head is provided with a cutter blade which is urged in a rectilinear path toward and into cutting relation with the outer circumference of the member to be debarked.

My invention is particularly adapted for use in debarking trees of a relatively small diameter between one and five inches. The term "trees," as used in the specification and claims, shall be interpreted to include tree tops, logs, branches, and other similar generally circular members having bark thereon. The debarkers used heretofore have not been adapted for handling small diameter trees, such as seedlings which are thinned. Accordingly, such trees or thinned seedlings normally have not been used for pulp wood since it has not been feasible economically to debark such trees. By the use of my invention, seedlings which are thinned and other small diameter trees may be debarked economically by my apparatus and then used commercially for pulp wood and the like. Thus, it is evident that a source of pulp wood which has not been available economically heretofore, has now been opened to the pulp wood industry.

My debarking apparatus is portable and may be transported to the location at which the trees are being thinned. In this location, the apparatus may be set up for operation in a minimum of time to debark the trees.

My rotary debarking head comprises a hollow shaft through which the trees pass along the axis of rotation thereof. A debarking head is mounted on the receiving end of the shaft and has a pair of oppositely arranged debarking tools mounted thereon. Each of the debarking tools has an opening therethrough in alignment with the hollow shaft and is mounted in guides for movement in a rectilinear path toward and away from the opening in the hollow shaft. A cutting blade is positioned on one side of the opening in the debarking tool and the weight of the debarking tool on the side thereof opposite the cutting blade is greater than the weight of the tool adjacent the cutting edge. Thus, upon rotation of the debarking head, the cutting blade or edge on the opposite side of the debarking tool from the larger weight is urged by centrifugal force in cutting relation toward a tree passing through the hollow shaft. The depth of cut made by the cutting blade and the pressure on the blade may be easily controlled by varying the weight of the debarking tool and by varying the rotational speed of the debarking head. Thus, for cutting the bark on different types of trees, the debarking tool can be easily adjusted by changing the weight thereon or by changing the rotational speed of the debarking head.

Also provided is an additional weight for the debarking tool which is actuated only when a tree over a predetermined diameter enters the debarking head. The weight is provided on the end of the debarking tool opposite the cutting edge and is engaged only when the cutting blade is moved a predetermined distance from the axis of rotation. Thus an increased centrifugal force is applied to the debarking tool upon rotation of the debarking head when trees of relatively large diameter are being debarked.

It is an object of my invention to provide a rotary debarking head having an axially extending opening through which trees and the like are passed together with a cutting blade urged in a rectilinear path toward a tree in the opening upon rotation of the debarking head.

It is a further object to provide a debarking tool for the debarking head having a cutting blade disposed on one side of the axially extending opening and being of a greater weight on the opposite side of the opening from the cutting blade whereby upon rotation of the debarking head, the cutting blade is pulled by centrifugal force toward the center of the opening for removing bark from a tree therein.

It is an additional object of my invention to provide a weight for the debarking tool which is actuated only when a tree over a predetermined diameter enters the debarking head, thereby providing a greater cutting force for large diameter trees.

Apparatus embodying features of my invention is illustrated in the accompanying drawings, forming a part of this application, in which:

Fig. 1 is a side elevational view of my debarking apparatus forming the present invention showing a tree being fed into a rotary debarking head and a debarked tree being removed from the debarking apparatus;

Fig. 2 is an end elevational view of the rotary debarking head in Fig. 1 shown detached from the debarking apparatus;

Fig. 3 is a side elevational view of the rotary debarking head shown in Fig. 2; and, Fig. 4 is a front elevational view of a debarking tool shown removed from the debarking head of Figs. 2 and 3, a portion of the debarking tool being shown in section.

Referring now in detail to the drawings for a better understanding of my invention, I show in Fig. 1 a debarking apparatus, indicated generally by the numeral 10, mounted on a support frame 11 having legs 12 thereon. A bark discharge chute 13 is arranged under frame 11 to receive the bark after it is removed from trees T, and a suitable conveyor (not shown) may be provided under discharge chute 13 to receive the bark therefrom and convey it away from the debarking apparatus.

The debarking apparatus 10 is mounted for rotation in a bearing 14 secured to frame 11 by suitable securing means 16. Debarking apparatus 10 comprises a hollow shaft 17 having a pair of pulleys 18 mounted on an end thereof. Pulleys 18 are driven by suitable belts 19 through suitable drive means (not shown).

The debarking head, indicated generally by the numeral 21, is mounted on the end of shaft 17 opposite the end thereof on which the pulleys 18 are mounted. Upper and lower driven rollers 22 are provided adjacent the receiving end of debarking head 21 and have center portions of a decreased diameter to form a pocket for trees T so that trees T will be centered when they enter the axial opening of debarker head 21 and are conveyed through shaft 17. Upper and lower driven rollers 23 are provided adjacent the discharge end of the debarking apparatus 10 to receive the debarked tree as it is discharged, and to aid in pulling the tree through shaft 17. The rollers 22 and 23 also restrain the trees T from rotating with the rotating debarking head 21 as the top rollers are mounted to engage resiliently the upper portion of the trees T.

Debarking head 21 comprises a supporting frame 26 having a sleeve 27 thereon that fits over the hollow shaft 17 and is secured thereto to hold debarking head 21 in place on shaft 17 for rotation therewith. A pair of oppositely arranged debarking tools 28 is mounted on the supporting frame 28 for movement in a rectilinear path toward and away from the axial opening in shaft 17. Each of the debarking tools 28 is identical and for the purpose of illustration, only one of the tools 28 is described in detail. Referring now to Fig. 4, debarking tool 28 comprises a central opening 29 which is at least as large as the axial opening in shaft 17 and is aligned therewith for receiving a tree T therein. A cutting blade 31 is provided at one end of opening 29 and is disposed to engage the trees T passing through opening 29. The weight of the tool 28 on the side of opening 29 opposite cutting blade 31 is greater than the weight of tool 28 on the side adjacent cutting blade 31. Thus, upon rotation of debarking head 21, the centrifugal force created thereby tends to pull cutting blade 31 into engagement with a tree T passing through opening 29. Lugs 32 are provided on opposite sides of debarking tool 28 and have apertures 33 therethrough for a purpose to be explained later. Cross members 34 and 35 are provided with openings 36 therethrough. The openings 36 on cross member 35 are threaded to receive threaded ends of guide rods 37 which are secured to debarking tools 28.

Frame 26 is provided with guides 45 on each end thereof. Guides 45 have apertures 38 extending therethrough which receive guide rods 37 in sliding relation. Guides 45 limit the movement of debarking tools 28 when tree T is removed from the debarking head 21. Centrifugal force exerted by the rotation of the debarking heads 21 pulls the debarking tools 28 in abutting relation to the guides 45 thereby limiting the movement of debarking tools 28 until another tree T is disposed within the debarking apparatus 10. To allow the debarking tools 28 to be returned to cutting position upon entry of another tree T upon continued operation of the debarking head 21, an outwardly flaring flange or hood 40 is provided on each of the debarking tools 28 adjacent the cutting blade 31. Upon introducing a tree T to be debarked into the axial opening of debarking head 21, it is aligned as it engages the hoods 40 thereby moving the debarking tools 28 in a rectilinear direction relative to the opening in shaft 17. That is to say, the hoods 40 serve as guides to aid in centering the tree T as it is fed into the head 21 by the rollers 22.

Intermediate guides 42 are also fixed on the supporting frame 26 and have openings 43 therethrough to receive guide rods 37 in sliding relation whereby the debarking tools 28 are guided.

When trees of a relatively large diameter are to be debarked, it is desirable for debarking tools 28 to exert a greater cutting force on the trees T as the bark is normally of a greater thickness than that in the smaller diameter trees. For that purpose, weights 46 are secured to weight bars 47 by set screws 48. Apertures 49 in guides 45 are provided to receive the weight bars 47 in sliding relation. In addition, guide extensions 51 are secured to the supporting frame 26 and have apertures 52 extending therethrough adapted to receive the weight bars 47 in sliding relation. It is evident that upon a large diameter tree T being inserted in debarking head 21, the tree will contact the hoods 40 and move debarking tools 28 away from guides 45. Upon the debarking tools 28 reaching the end of the weight bars 47, lugs 32 engage enlarged end portions 53 of weight bars 47 and the debarking tools 28 lift weights 46 upon further movement of the debarking tools 28. Thus, an increased weight is provided on the side of opening 29 opposite the cutting blade 31 whereby, upon rotation of debarking head 21, a greater centrifugal force will be exerted on the cutting blades 31. The weight members 46 can be adjusted axially on weight bars 47 so as to be actuated upon a predetermined diameter of tree T passing through the debarking apparatus 10.

As shown in Fig. 3, the debarking tools 28 are oppositely arranged but are staggered in an axial direction so as to permit an overlapping of the debarking tools 28. Thus, viewing Fig. 3, the weight of the supporting frame 26 adjacent the lower debarking tool 28 is greater than the weight of the supporting frame 26 adjacent the upper debarking tools 28. That is, extensions are required on the lower supporting frame, as viewed in Fig. 3, whereby the lower tool 28 is supported further from the sleeve 27 than is the upper tool 28. To counterbalance the increased weight of the supporting frame 26 adjacent the lower tool 28, a counterweight 54 is provided adjacent the upper debarking tool 28 and thus, a balanced debarking head 21 is obtained.

In operation, the driven rollers 22 support and convey a tree T to the receiving end of my debarking head 21. The tree T engages the hoods 40 and moves the debarking tools 28 to a position whereby the tree T can easily enter the opening in shaft 17. The rotating debarking head 21 exerts a centrifugal force on the debarking tools 28 and the cutting blades 31 move into cutting engagement with the tree T and cut the bark therefrom. The pressure or force exerted by cutting blades 31 can be easily determined by the weight of debarking tools 28 and by the rotational speed of the debarking head 21. Further, upon a predetermined diameter of tree T being received by the debarking head 21, weights 46 are actuated to provide an increased weight for the debarking tool 28 opposite the side on which the cutting blade 31 is disposed. It is evident that the debarking head 21 may be adjusted so that the fibers of the trees T being debarked will not be cut or harmed.

While I have shown only two tools 28 as being mounted on the head 21, it will be apparent that a plurality of such tools could be mounted thereon. However, the tools 28 should be spaced at such angular distances from each other that the head 21 is balanced.

While I have shown my invention in but one form it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. Apparatus for removing bark from trees comprising a shaft having an opening therethrough generally along its axis of rotation and adapted to receive trees therein, means to rotate said shaft, a debarking head mounted on an end of said shaft, a debarking tool mounted on said head for rectilinear movement in a path toward and away from the shaft opening, a cutting blade facing said opening on one side of said debarking tool, the portion of the debarking tool on the side of said opening opposite the cutting blade being of a greater weight than that of the side adjacent the cutting blade whereby upon rotation of the shaft the cutting blade is urged into engagement with the tree by centrifugal force, a movable weight member mounted on said debarking head adjacent the side of the tool opposite the cutting blade thereof, and means on said debarking tool engaging said weight member to draw the latter toward the axis of the shaft upon movement of said cutting blade a predetermined distance from the axis of rotation of said shaft.

2. Apparatus for removing bark from trees comprising a shaft having an opening therethrough generally along its axis of rotation and adapted to receive trees therein, means to rotate said shaft, a debarking head mounted on said shaft about said opening, a debarking tool mounted on said head for rectilinear movement in a generally radial path toward and away from the shaft opening, said debarking tool having an opening in axial alignment with the shaft opening and adapted to receive trees therein, a cutting blade positioned on one side of said debarking tool and adapted to engage trees in cutting relation as they pass through the opening in the debarking tool, the portion of the debarking tool positioned on the side of the shaft opening opposite the cutting blade being of a greater weight than the portion thereof adjacent the cutting blade, a weight member positioned on said debarking head adjacent the side of said tool opposite the cutting blade thereof for sliding movement in a radial direction, and means on said debarking tool engaging said weight member to draw the latter toward the axis of the shaft upon movement of said cutting blade a predetermined distance from the axis of rotation of said shaft, whereby said weight member is carried by said tool to increase the weight of said tool on the side thereof opposite the cutting blade.

References Cited in the file of this patent

UNITED STATES PATENTS

| | | |
|---|---|---|
| 379,559 | Brokaw | Mar. 20, 1888 |
| 1,102,657 | Hafner | July 7, 1914 |
| 2,843,168 | Lunn | July 15, 1958 |

FOREIGN PATENTS

| | | |
|---|---|---|
| 40,582 | Denmark | Aug. 5, 1929 |
| 801,303 | Germany | Jan. 4, 1951 |
| 140,626 | Sweden | June 2, 1953 |